United States Patent
Cho et al.

(10) Patent No.: US 9,677,966 B2
(45) Date of Patent: Jun. 13, 2017

(54) WATER LEAK SENSOR MANAGEMENT METHOD, WATER LEAK SENSOR PERFORMING THE SAME AND STORAGE MEDIA STORING THE SAME

(71) Applicant: LG CNS CO., LTD., Seoul (KR)

(72) Inventors: Sang Woong Cho, Seoul (KR); Cheolsoon Park, Seoul (KR); Sook-Ryon Seo, Seoul (KR); Jongpil Ahn, Seoul (KR)

(73) Assignee: LG CNS CO., LTD., Seoul (KR)

( * ) Notice: Subject to any disclaimer, the term of this patent is extended or adjusted under 35 U.S.C. 154(b) by 259 days.

(21) Appl. No.: 14/310,843

(22) Filed: Jun. 20, 2014

(65) Prior Publication Data

US 2015/0000380 A1    Jan. 1, 2015

(30) Foreign Application Priority Data

Jun. 26, 2013  (KR) .................. 10-2013-0074004

(51) Int. Cl.
G08B 1/08       (2006.01)
G08B 21/00      (2006.01)
G01M 3/00       (2006.01)
F17D 5/06       (2006.01)
G01M 3/24       (2006.01)
H04L 29/08      (2006.01)
H04W 52/02      (2009.01)
H04W 84/18      (2009.01)

(52) U.S. Cl.
CPC .............. G01M 3/00 (2013.01); F17D 5/06 (2013.01); G01M 3/243 (2013.01); H04L 67/12 (2013.01); H04W 52/0235 (2013.01); H04W 52/0254 (2013.01); H04W 84/18 (2013.01)

(58) Field of Classification Search
CPC .. G01M 3/00; G01M 3/18; G08B 7/06; G08B 17/00; G01F 1/66; G01F 1/26; G01F 1/3203
USPC .......... 340/521, 539.22, 691.4, 10.33, 539.3, 340/602–605, 618; 73/40
See application file for complete search history.

(56) References Cited

U.S. PATENT DOCUMENTS

| 6,442,999 | B1 * | 9/2002 | Baumoel ................... G01F 1/66 73/40.5 A |
| 9,506,785 | B2 * | 11/2016 | Turk ........................ G01F 1/065 |
| 2005/0147049 | A1 * | 7/2005 | Ganesan ............. H04M 1/2535 370/241 |
| 2005/0223259 | A1 * | 10/2005 | Lehwalder ................ G06F 1/26 713/330 |
| 2006/0294403 | A1 * | 12/2006 | Bennett ................. G06F 1/3203 713/300 |

(Continued)

Primary Examiner — Hoi Lau
(74) Attorney, Agent, or Firm — Lee Hong Degerman Kang & Waimey (57) ABSTRACT

A water leak sensor management method includes a water leak sensor being installed in a underground pipe. The method includes detecting an operation time of the water leak sensor through a timer in a sleep mode, changing the sleep mode into a standby mode in the operation time of the water leak sensor to detect a sensor measuring procedure, and performing an operation for a transceiving component of the water leak sensor and determining whether the water leak sensor receives an external command or changes the standby mode into an operation mode based on the sensor measuring procedure.

17 Claims, 7 Drawing Sheets

(56) References Cited

U.S. PATENT DOCUMENTS

| | | | |
|---|---|---|---|
| 2007/0139183 A1* | 6/2007 | Kates | G08B 25/005 340/521 |
| 2007/0273484 A1* | 11/2007 | Cederlof | H04W 52/0225 340/10.33 |
| 2011/0032114 A1* | 2/2011 | Egawa | G08B 7/06 340/691.4 |
| 2015/0000380 A1* | 1/2015 | Cho | G01M 3/00 73/40 |
| 2015/0002300 A1* | 1/2015 | Cho | G01M 3/18 340/605 |
| 2015/0008732 A1* | 1/2015 | Fujimoto | H03K 19/003 307/9.1 |

\* cited by examiner

WATER LEAK SENSOR MANAGEMENT METHOD, WATER LEAK SENSOR PERFORMING THE SAME AND STORAGE MEDIA STORING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0074004, filed on Jun. 26, 2013, the contents of which are hereby incorporated by reference herein in their entirety.

BACKGROUND OF THE INVENTION

Field of the Invention

The present invention relates to water leak sensor management technology and more particularly to a water leak sensor management method, a water leak sensor and a storage media having a sensor management mode to minimize battery power consumption.

Background of the Invention

A wireless sensor network remotely processes and manages various information collected from a plurality of sensor nodes installed outside through a network system. The sensor nodes receive power through separate electric power supply equipment, such as a battery. The wireless sensor network system assigns a computing and communicating function to the plurality of the sensor nodes and causes the sensor nodes to communicate with each other anytime and anywhere regardless of network, device, and service.

Korean Patent Registration No. 10-0881273 discloses a sensor node on a wireless sensor network and an operating method for detecting generation of a specific event with a low powered sensor node in a normal status and collecting detailed sensing information and information by a heterogeneous sensor which is effective in determining status. The sensor node of the wireless sensor network may improve the accuracy for status recognition of the sensor network and may accurately monitor the generation of an event.

Korean Patent Registration No. 10-1056054 discloses a wireless sound emission sensor detecting a small sound signal, amplifying and processing the detected sound signal, and changing the detected signal into a radio signal and wirelessly transmitting the radio signal to a remote receiver. The wireless sound emission sensor is provided to improve accuracy in signal transmission using RF communication or local wireless communication.

The sensor node of the wireless sensor network system operates using separate power supply equipment, such as a battery, which need periodic replacement. The sensor node is typically installed near an underground structure so that management costs may be high for tending to such battery replacement.

SUMMARY

Embodiments of the present invention propose a water leak sensor management method including a sensor management mode to minimize battery power consumption.

Embodiments of the present invention propose a water leak sensor management method setting an operation time of a water leak sensor according to a manual mode or an automatic mode to implement a sensor management mode.

Embodiments of the present invention proposes a water leak sensor management method performing time synchronization with a control server when an external command is received to provide a water leak status to the control server.

In some embodiments, the water leak sensor is installed in a underground pipe, and the method includes (a) detecting an operation time of the water leak sensor through a timer in a sleep mode, (b) changing the sleep mode into a standby mode in the operation time of the water leak sensor to detect a sensor measuring procedure and (c) performing an operation for a transceiving component of the water leak sensor and determining whether the water leak sensor receives an external command or changes the standby mode into an operation mode based on the sensor measuring procedure.

In one embodiment, operation (a) may include supplying a power to a RTC (Real Time Clock) in the sleep mode while the water leak sensor blocks the power for the transceiving component.

The operation (a) further may further include providing a battery status to a control server when a battery level is less than a specific criteria to cause the control server to adjust the operation time of the water leak sensor.

In one embodiment, operation (b) may include starting to supply power to the transceiving component when the operation time of the water leak sensor is detected.

Operation (c) may include waiting for receiving an external command during a specific time interval when the sensor measuring procedure operates as a manual mode. Operation (c) may include changing the standby mode into the operation mode to start to supply power to a sound sensing component when the external command is received.

The external command may include at least one of a water leak sound data collection command, a water pressure data collection command, or a flow velocity data collection command for the underground pipe.

In one embodiment, the operation (c) may include transmitting a digital signal to a control server through an antenna, blocking a power for the sound sensing component when the transmission of the digital signal is completed and enforcing a block of the power to change the management mode into the sleep mode when the block of the power for the sound sensing component is not completed after the specific time.

Operation (c) may include performing a shutdown on the transceiving component when the external command is not received and restoring the standby mode to the sleep mode.

In one embodiment, the operation (c) may include changing the standby mode into the operation mode when the sensor measuring procedure operates as an automatic mode and analyzing a batch file predetermined by a user to start to supply a power to an operation component related with the batch file. The operation component may include the sound sensing component.

Operation (c) may include sensing a vibration by a sound wave of the underground pipe through an acceleration sensor of the sound sensing component in the operation mode to output an electric charge corresponding a vibration level.

Operation (c) may include converting the electric charge outputted from the acceleration sensor into a voltage to amplify the voltage through an amp of the sound sensing component.

Operation (c) may include transmitting a digital signal to a control server through an antenna, blocking a power for the sound sensing component when the transmission of the digital signal is completed and enforcing a block of the power to change the management mode into the sleep mode when the blocking of the power is not completed after a specific time.

In some embodiments, a water leak sensor includes an operation time detecting unit detecting an operation time of a water leak sensor through a timer in a sleep mode, a sensor measuring procedure detecting unit changing the sleep mode into a standby mode in the operation time of the water leak sensor to detect a sensor measuring procedure and an operation determining unit performing an operation for a transceiving component and determining whether the water leak sensor receives an external command or changes the standby mode into an operation mode based on the sensor measuring procedure.

In one embodiment, the operation time detecting unit may supply power to a RTC (Real Time Clock) in the sleep mode while the water leak sensor blocks power for the transceiving component. The sensor measuring procedure detecting unit may start to supply power to the transceiving component when the operation time of the water leak sensor is detected.

The operation determining unit may wait for receiving an external command during a specific time interval when the sensor measuring procedure operates as a manual mode.

The operation determining unit may change the standby mode into the operation mode when the sensor measuring procedure operates as an automatic mode and may analyze a batch file predetermined by a user to supply power to an operation component related with the batch file. The operation component may include a sound sensing component.

In some embodiments, a storage medium storing a computer program for a water leak management method that includes a function of detecting an operation time of the water leak sensor through a timer in a sleep mode, a function of changing the sleep mode into a standby mode in the operation time of the water leak sensor to detect a sensor measuring procedure and a function of performing an operation for a transceiving component of the water leak sensor and determining whether the water leak sensor receives an external command or changes the standby mode into an operation mode based on the sensor measuring procedure.

Embodiments of the present invention may include a sensor management mode to minimize battery power consumption.

Embodiments of the present invention may set an operation time of a water leak sensor according to a manual mode or an automatic mode to implement a sensor management mode.

Embodiments of the present invention may perform a time synchronization with a control server when an external command is received to provide a water leak status to the control server.

DETAILED DESCRIPTION

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

The term "and/or" should be understood as including all of combination that can be made from one or more relevant items. For example, the term "the first item, the second item, and/or the third item" means not only the first, the second, or the third item, but the combination of all of items that can be made from two or more of the first, second, or third items.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The present invention may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computer-readable recording medium may be distributed among networked machine systems which store and execute machine-readable codes in a de-centralized manner.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Figure 1:
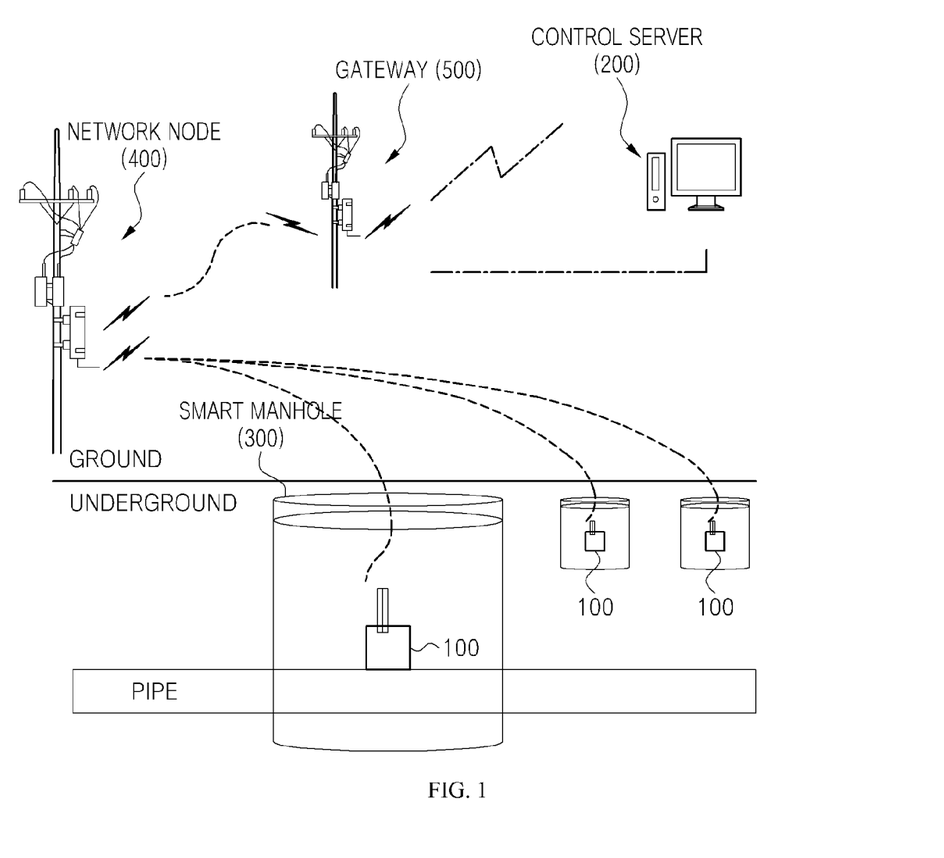
FIG. 1 is a diagram showing a water leak sensor in communication with a control server.

FIG. 1 is a diagram showing a water leak sensor in communication with a control server. In this figure, the water leak sensor 100 is installed in an exposed space of an underground pipe. The water leak sensor 100 may detect a water leak sound at a specific period or per a user's request, and the sensor may convert the water leak sound into a digital signal to transmit to a smart manhole 300. The management mode of the water leak sensor 100 may include a sleep mode, a standby mode, and an operation mode, in order to minimize unnecessary battery power consumption. Note that various embodiments presented herein are discussed in the context of a pipe located underground. However, such teachings equally apply to other pipe installation configurations (e.g., above ground, concealed, exposed, combinations thereof, and the like).

Figure 4:
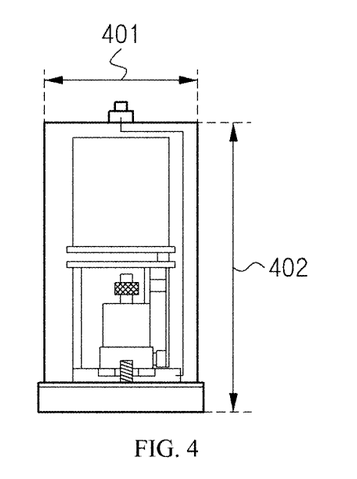
FIG. 4 is a front elevation diagram illustrating the water leak sensor of FIG. 1 in an installed configuration.

Referring ahead to FIG. 4, in accordance with one embodiment, the water leak sensor 100 may be installed in a cylinder type water leak sensor case having a 66 mm diameter 401 and a 125 mm through 130 mm height 402, and also be configured to detect a water leak sound. Typically, the water leak sensor case may be formed as an outdoor waterproof structure.

Referring again to FIG. 1, the smart manhole 300 may be formed so that the digital signal for the water leak sound detected by the water leak sensor 100 may be transmitted. The network node 400 may be wirelessly connected with at least one water leak sensor 100. The network node 400 may perform timing synchronization among the water leak sensors 100, the network node 400, and a gateway 500 through a NTP (Network Time Protocol) server. In one embodiment, there are multiple network nodes 400 to form an AD-HOC network that is directly or indirectly connected with the gateway 500.

The gateway 500 may be wirelessly connected to a control server 200 and is configured to transmit the digital signal received from the network node 400 to the control server 200. In one embodiment, the gateway 500 may utilize a GPS (Global Positioning System) to set a time on the NTP server, and be further configured to perform the time synchronization between the network node 400 and the gateway 500. Typically, the gateway 500 may be implemented using one of the network nodes 400.

The control server 200 may analyze the digital signal received through the gateway 500 to determine whether a water leak occurs or to detect a water leak location.

Figure 2:
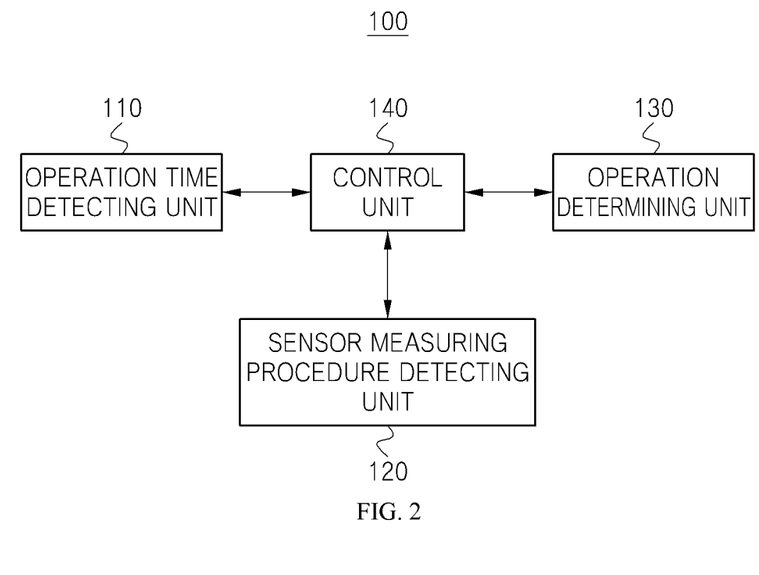
FIG. 2 is a block diagram showing the water leak sensor of FIG. 1.

FIG. 2 is a block diagram showing the water leak sensor of FIG. 1. In this figure, the water leak sensor 100 includes an operation time detecting unit 110, a sensor measuring procedure detecting unit 120, an operation determining unit 130 and a control unit 140.

The operation time detecting unit 110 detects the operation time of the water leak sensor through a timer during the sleep mode. In one embodiment, the operation time detecting unit 110 may supply power to a RTC (Real Time Clock) in the sleep mode while the water leak sensor 100 blocks power for a transceiving component. The transceiving component may be implemented using a Binary CDMA (Code Division Multiple Access) capable of transmitting data for a water leak sound detected from the water leak sensor 100 to the control server 200. For example, the operation time detecting unit 110 may supply power to RTC (Real Time Clock) of a CPU (Central Processing Unit) to cause the water leak sensor 100 to be operated by a relatively small amount of battery power.

The operation time detecting unit 110 may provide a battery status to the control server 200 when the battery level is less than a specific criteria to cause the control server 200 to adjust operation time of the water leak sensor. For example, the operation time detecting unit 110 may provide the battery status to the control server 200 when the battery level is less than the specific criteria (e.g., one third of a fully charged status) to cause the control server 200 to adjust the operation time of the water leak sensor. The operation time of the water leak sensor being adjusted in the above procedure may be adjusted by an automatic mode of a sensor measuring procedure.

The sensor measuring procedure detecting unit 120 changes the sleep mode into the standby mode in the operation time of the water leak sensor to detect the sensor measuring procedure. In one embodiment, the sensor measuring procedure detecting unit 120 may start to supply the power to the transceiving component when the operation time of the water leak sensor is detected. For example, when the operation time of the water leak sensor is detected, the sensor measuring procedure detecting unit 120 may supply power to the Binary CDMA (Code Division Multiple Access) and the CPU (Central Processing Unit) to start a booting of the Binary CDMA (Code Division Multiple Access) and the CPU (Central Processing Unit).

The sensor measuring procedure detecting unit 120 may detect the sensor measuring procedure in a manual mode or in an automatic mode. The manual mode may aperiodically change the management mode into the standby mode when the user requests and cause the water leak sensor 100 to check whether there exists an external command, and the automatic mode may change the management mode into the standby mode at a predetermined time in the water leak sensor 100 and cause the water leak sensor 100 to perform according to a command.

The operation determining unit 130 performs an operation for the transceiving component of the water leak sensor 100 and determines whether the water leak sensor 100 receives the external command or changes the standby mode into the operation mode based on the sensor measuring procedure. The external command may correspond to at least one of a water leak sound data collection command, a water pressure data collection command, or a flow velocity data collection command for the underground pipe.

The operation determining unit 130 may wait for receiving the external command during a specific time interval when the sensor measuring procedure operates in the manual mode in the sensor measuring procedure detecting unit 120. The specific time interval may be a pre-set time in the control server 200. In one embodiment, the operation determining unit 130 may change the standby mode into the operation mode to start to supply power to a sound sensing component when the external command is received in the manual mode. For example, the sound sensing component may correspond to an acceleration sensor, an amp and an A/D board.

In more detail, the operation determining unit 130 may sense vibration of a sound wave of the underground pipe through the acceleration sensor of the sound sensing component in the operation mode to output an electric charge corresponding to a vibration level, and may convert the electric charge output from the acceleration sensor into a voltage to amplify the voltage through the amp of the sound sensing component. Then, the operation determining unit 130 may convert an analog signal amplified in the amp to a digital signal through the A/D board of the sound sensing component to transmit the digital signal to the control server 200 through an antenna. The operation determining unit 130 may block the power for the sound sensing component when the transmission of the digital signal is completed and may enforce a block of the power to change the management mode into the sleep mode when the block of the power for the sound sensing component is not completed after the specific time.

In another embodiment, when the external command is not received in the manual mode, the operation determining unit 130 may perform a shutdown on the transceiving component and may restore the standby mode to the sleep mode. In this regard, the operation determining unit 130 may block the power supplied to the Binary CDMA and CPU and may cause the operation time detecting unit 110 to supply power to the RTC.

When the sensor measuring procedure operates in the automatic mode in the sensor measuring procedure detecting unit 120, the operation determining unit 130 may change the standby mode into the operation mode. In one embodiment, the operation determining unit 130 may change the standby mode into the operation mode and may analyze a batch file predetermined by a user to start to supply the power to an operation component related to the batch file. This batch file may write a series of commands being performed in the operation mode as one file to include. For example, the operation component may correspond to the sound sensing component.

In more detail, the operation determining unit 130 may sense vibration by the sound wave of the underground pipe through the acceleration sensor of the sound sensing component in the operation mode to output the electric charge corresponding the vibration level and may convert the electric charge outputted from the acceleration sensor into voltage to amplify the voltage through the amp of the sound sensing component. Then, the operation determining unit 130 may convert the analog signal amplified in the amp to a digital signal through the A/D board of the sound sensing component to transmit the digital signal to the control server 200 through the antenna. The operation determining unit 130 may block the power for the sound sensing component when the transmission of the digital signal is completed and may enforce a block of the power to change the management mode into the sleep mode when the block of the power for the sound sensing component is not completed after the specific time.

The control unit 140 may control a whole operation of the water leak sensor 110 and may control a control flow or data flow among the operation time detecting unit 110, the sensor measuring procedure detecting unit 120 and the operation determining unit 130.

Figure 3:
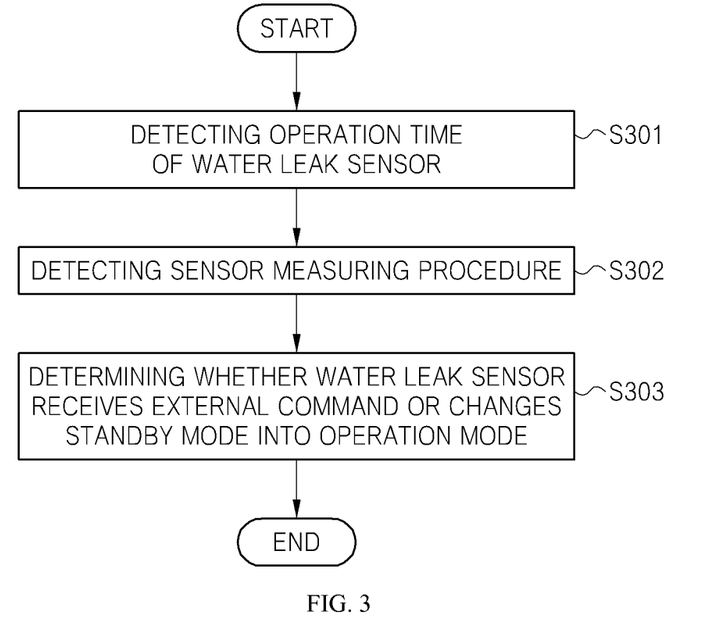
FIG. 3 is a flowchart of a water leak sensor management procedure being performed using the water leak sensor of FIG. 1.

FIG. 3 is a flowchart of a water leak sensor management procedure being performed using the water leak sensor of FIG. 1. In this figure, the operation time detecting unit 110 detects the operation time of the water leak sensor through the timer in the sleep mode (block S301). In one embodiment, the operation time detecting unit 110 may supply the power to the RTC (Real Time Clock) in the sleep mode while the water leak sensor 100 blocks the power for the transceiving component.

The sensor measuring procedure detecting unit 120 then changes the sleep mode into the standby mode to detect the sensor measuring procedure in the operation time of the water leak sensor (block S302). In one embodiment, when the operation time of the water leak sensor is detected, the sensor measuring procedure detecting unit 120 may start to supply the power to the transceiving component.

The operation determining unit 130 performs the operation for the transceiving component of the water leak sensor 100 and determines whether the water leak sensor 100 receives the external command or changes the standby mode into the operation mode based on the sensor measuring procedure (block S303). In one embodiment, the operation determining unit 130 may wait for receiving the external command during a specific time interval when the sensor measuring procedure operates as the manual mode. For example, when the external command is received in the manual mode, the operation determining unit 130 may change the standby mode into the operation mode to start to supply the power for the sound sensing component. As another example, when the external command is not received, the operation determining unit 130 may shutdown the transceiving component and may change the standby mode to the sleep mode.

In another embodiment, when the sensor measuring procedure operates as the automatic mode, the operation determining unit 130 may change the standby mode into the operation mode.

Figure 5A:
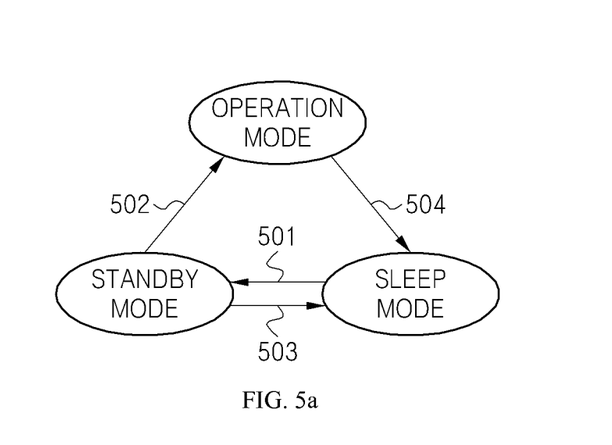
FIGS. 5(a) and 5(b) illustrate a management mode of the water leak sensor of FIG. 1.
Figure 5B:
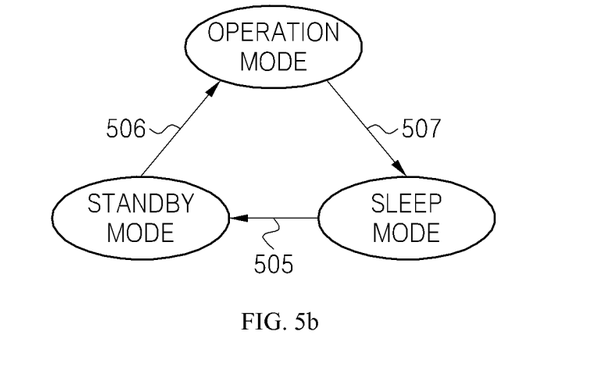

FIGS. 5(*a*) and 5(*b*) illustrate a management mode of the water leak sensor of FIG. 1. The standby mode and the operation mode may be performed on the operation time detecting unit 110, the sensor measuring procedure detecting unit 120 and the operation determining unit 130.

FIG. 5(*a*) illustrates manual mode procedures and the management mode of the water leak sensor 100 as being changed into the standby mode in the operation time of the water leak sensor to cause the water leak sensor 100 to check whether the external command signal 501 exists. The operation time of the water leak sensor 501 may correspond to a time aperiodically requested by the user. When the external command signal is checked, the water leak sensor 100 may change 502 the standby mode into the operation mode to perform the time synchronization and to process the water leak sound. Then, when completed, the water leak sensor 100 may change the management mode back into the sleep mode 504. When the external command 100 is not checked 503 in the standby mode, the water leak sensor 100 may restore the management mode to the sleep mode.

FIG. 5(*b*) is a procedure being performed in the automatic mode and the water leak sensor 100 may change the management mode from the sleep mode into the standby mode in the operation time of the water leak sensor to prepare for performing a predetermined command. The operation time of the water leak sensor 505 may be a time predetermined in the control server 200. When preparation for performing the command is completed 506, the water leak sensor 100 may change the standby mode into the operation mode to perform the time synchronization and to process the water leak sound. Then, when all data processing is completed 507, the water leak sensor 100 may change the management mode into the sleep mode.

Figure 6:
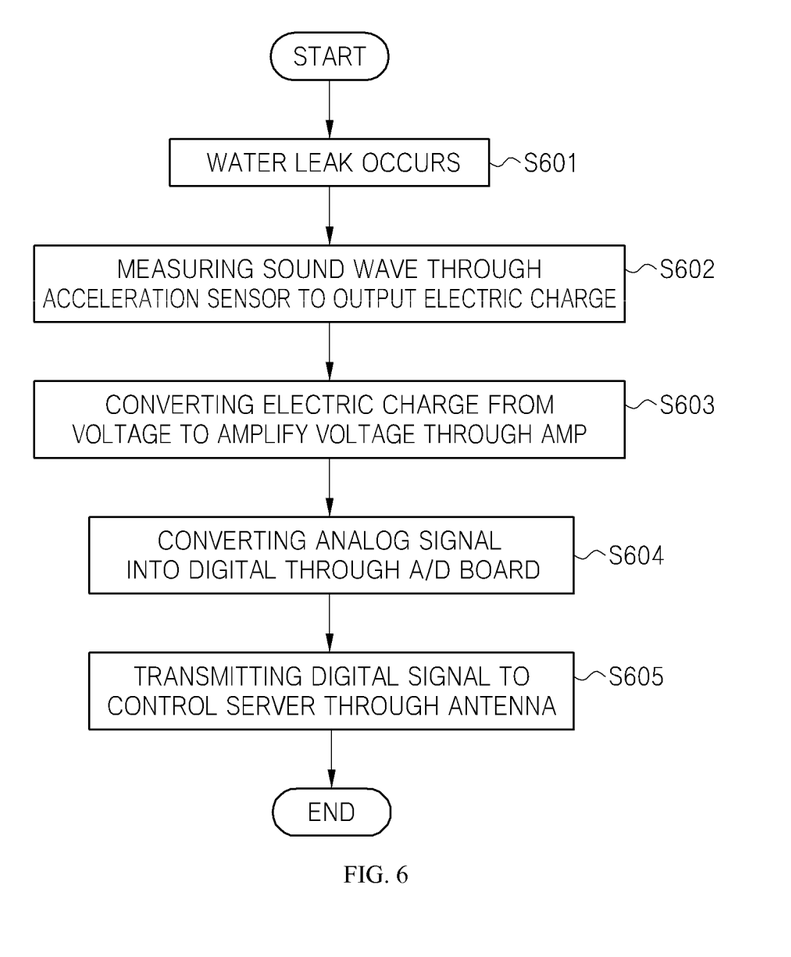
FIG. 6 is a flowchart of a management procedure of components being performed during an operation mode of the water leak sensor of FIG. 1.

FIG. 6 is a flowchart of a management procedure of components being performed during an operation mode of the water leak sensor of FIG. 1. In this figure, when a water leak occurs in a pipe, the water leak sensor 100 measures a sound wave through the acceleration sensor to output an electric charge (blocks S601 and S602). The acceleration sensor may sense the vibration by the sound wave being generated in water leak point to output the electric charge corresponding the vibration level.

The water leak sensor 100 may convert the electric charge outputted from the acceleration sensor into a voltage through a ChargeAMP to 20 times amplify the voltage through a PreAMP and to additionally 20 times through 50 times amplify the voltage through the MainAMP (block S603).

The water leak sensor 100 converts the analog signal amplified by the PreAMP and MainAMP through ADC (Analog to Digital Converter) and provides this signal to the CPU, which processes this digital signal that is then provided to the Binary CDMA (block S604). When the digital signal is provided to the antenna through a RF communication procedure of a 2.4 GHz in the Binary CDMA, the water leak sensor 100 provides the digital signal to the control server 200 through the antenna (block S605). The water leak sensor 100 may transmit the digital signal to the network node 400 through the antenna, the network node 400 may then transmit the digital signal to the gateway 500, and the gateway 500 may transmit the digital signal to the control server 200. For example, a structural relationship of the water leak sensor 100 and the network node 400 may be N:1, a structural relationship of the network node 400 and the gateway 500 may be N:1 and a structural relationship of the gateway 500 and the control server 200 may be N:1.

Figure 7:
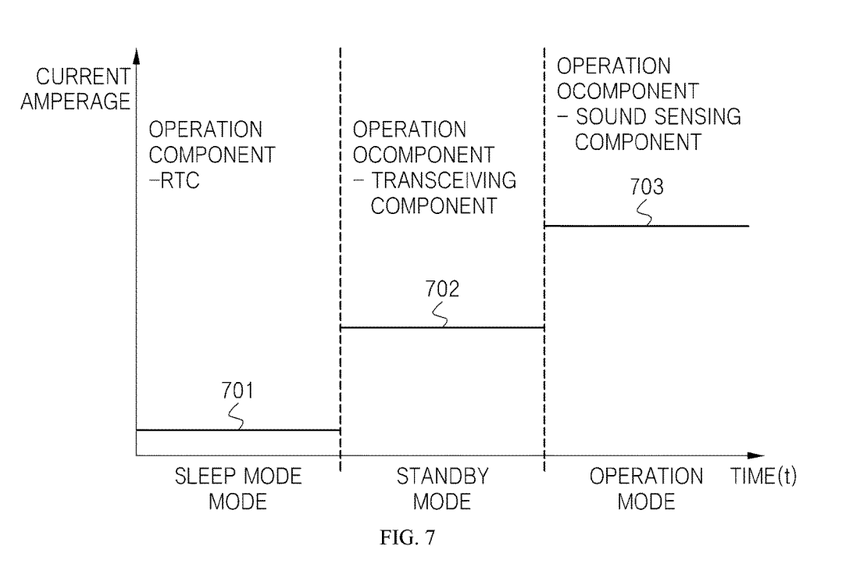
FIG. 7 is a diagram illustrating an amount of a battery current being used according to a management mode of the water leak sensor in FIG. 1.

FIG. 7 is a diagram illustrating an amount of a battery current being used according to a management mode of the water leak sensor in FIG. 1. In this figure, the water leak sensor 100 may be usually managed in the sleep mode to provide the power to the RTC being operated in the sleep mode. For example, the water leak sensor 100 may use an amount of battery current as much as a value indicated in the reference numeral 701 in the sleep mode.

When the sleep mode is changed into the standby mode, the water leak sensor 100 may supply the power to at least one transceiving component being operated in the standby mode. For example, the water leak sensor may use an amount of battery current as much as a value indicated in the reference numeral 702 in the sleep mode.

When the standby mode is changed into the operation mode, the water leak sensor 100 may supply the power to at least one sound sensing component being operated in the operation mode. For example, the water leak sensor 100 may use an amount of battery current as much as a value indicated in the reference numeral 703 in the sleep mode.

Although this document provides descriptions of preferred embodiments of the present invention, it would be understood by those skilled in the art that the present invention can be modified or changed in various ways without departing from the technical principles and scope defined by the appended claims.

DESCRIPTION OF SYMBOLS

100: WATER LEAK SENSOR
110: OPERATION TIME DETECTING UNIT
120: SENSOR MEASURING PROCEDURE DETECTING UNIT
130: OPERATION DETERMINING UNIT
140: CONTROL UNIT
200: CONTROL SERVER
300: SMART MANHOLE
400: NETWORK NODE
500: GATEWAY

What is claimed is:

1. A method for managing a water leak sensor coupled to a pipe, the method comprising:
   detecting an operation time of the water leak sensor that is in a sleep mode, wherein in the sleep mode the water leak sensor supplies power to a real time clock (RTC) while blocking power to a transceiving component and blocking power to a sound sensing component;
   causing the water leak sensor to change from the sleep mode to a standby mode according to the detected operation time, wherein in the standby mode the water leak sensor supplies power to both the RTC and the transceiving component, and continues to block power to the sound sensing component;
   detecting a sensor measuring procedure after the water leak sensor changes to the standby mode;
   performing an operation for the transceiving component of the water leak sensor based on the detected sensor measuring procedure; and
   changing from the standby mode to an operation mode when the water leak sensor receives an external command via the transceiving component or when directed to by the detected sensor measuring procedure, wherein during the operation mode the water leak sensor supplies power to all of the RTC, the transceiving component, and the sound sensing component; and
   obtaining data relating to the pipe after the power is supplied to the sound sensing component.

2. The method of claim 1, wherein while the water leak sensor is in the sleep mode, the method further comprises:
   providing battery status of the water leak sensor to a control server when a battery level of the water leak sensor is less than a threshold level, wherein the battery status causes the control server to adjust the operation time of the water leak sensor.

3. The method of claim 1, further comprising:
   supplying the power to the transceiving component when the operation time of the water leak sensor is detected.

4. The method of claim 1, further comprising:
   waiting, during a specific time interval, for the receiving of the external command when the sensor measuring procedure operates as a manual mode.

5. The method of claim 4, further comprising:
   performing a shutdown on the transceiving component when the external command is not received and changing from the standby mode to the sleep mode.

6. The method of claim 1, wherein the external command corresponds to at least one of a water leak sound data collection command, a water pressure data collection command, or a flow velocity data collection command for the pipe.

7. The method of claim 6, further comprising:
obtaining the data relating to the pipe according to the external command;
transmitting a digital signal to a control server through an antenna, wherein the digital signal corresponds to the obtained data; and
blocking the power to the sound sensing component after the transmitting of the digital signal; and
changing the operating mode to the sleep mode when the blocking of the power to the sound sensing component is not completed after a specific time.

8. The method of claim 1, further comprising:
changing from the standby mode to the operation mode when the sensor measuring procedure operates as an automatic mode and analyzing a batch file predetermined by a user to start to supply power to an operation component related to the batch file, and
wherein the operation component corresponds to the sound sensing component.

9. The method of claim 8, further comprising:
sensing vibration of a sound wave of the pipe through an acceleration sensor of the sound sensing component during the operation mode; and
outputting an electric charge corresponding a vibration level of the sensed vibration.

10. The method of claim 9, further comprising:
converting the electric charge into a voltage and amplifying the voltage via an amp of the sound sensing component.

11. The method of claim 10, further comprising:
transmitting a digital signal to a control server through an antenna, wherein the digital signal corresponds to the amplified voltage; and
blocking power to the sound sensing component after the transmitting of the digital signal; and
changing from the operating mode to the sleep mode when the blocking of the power for the sound sensing component is not completed after a specific time.

12. The method of claim 1, wherein the pipe is underground.

13. A water leak sensor, comprising:
an operation time detecting unit configured to detect an operation time of the water leak sensor that is in a sleep mode, wherein in the sleep mode the water leak sensor supplies power to a real time clock (RTC) while blocking power to a transceiving component and blocking power to a sound sensing component;
a sensor measuring procedure detecting unit configured to:
cause the water leak sensor to change from the sleep mode to a standby mode according to the detected operation time, wherein in the standby mode the water leak sensor supplies power to both the RTC and the transceiving component, and continues to block power to the sound sensing component;
detect a sensor measuring procedure after the water leak sensor changes to the standby mode;
an operation determining unit configured to:
perform an operation for the transceiving component of the water leak sensor based on the detected sensor measuring procedure; and
change from the standby mode to an operation mode when the water leak sensor receives an external command via the transceiving component or when directed to by the detected sensor measuring procedure, wherein during the operation mode the water leak sensor supplies power to all of the RTC, the transceiving component, and the sound sensing component; and
obtain data relating to the pipe after the power is supplied to the sound sensing component.

14. The water leak sensor of claim 12, wherein the sensor measuring procedure detecting unit is further configured to supply the power to the transceiving component when the operation time of the water leak sensor is detected.

15. The water leak sensor of claim 12, wherein the operation determining unit is further configured to wait, during a specific time interval, for the receiving of the external command when the sensor measuring procedure operates as a manual mode.

16. The water leak sensor of claim 12, wherein the operation determining unit is further configured to change from the standby mode to the operation mode when the sensor measuring procedure operates as an automatic mode and analyze a batch file predetermined by a user to start to supply power to an operation component related to the batch file, and
wherein the operation component corresponds to the sound sensing component.

17. A machine-readable non-transitory medium having stored thereon machine-executable instructions that is executed by a processor for:
detecting an operation time of the water leak sensor that is in a sleep mode, wherein in the sleep mode the water leak sensor supplies power to a real time clock (RTC) while blocking power to a transceiving component and blocking power to a sound sensing component;
causing the water leak sensor to change from the sleep mode to a standby mode according to the detected operation time, wherein in the standby mode the water leak sensor supplies power to both the RTC and the transceiving component, and continues to block power to the sound sensing component;
detecting a sensor measuring procedure after the water leak sensor changes to the standby mode;
performing an operation for the transceiving component of the water leak sensor based on the detected sensor measuring procedure; and
changing from the standby mode to an operation mode when the water leak sensor receives an external command via the transceiving component or when directed to by the detected sensor measuring procedure, wherein during the operation mode the water leak sensor supplies power to all of the RTC, the transceiving component, and the sound sensing component; and
obtaining data relating to the pipe after the power is supplied to the sound sensing component.

\* \* \* \* \*